(12) United States Patent
Ger (10) Patent No.: US 7,792,019 B1
(45) Date of Patent: Sep. 7, 2010

(54) CALL MANAGEMENT

(75) Inventor: Shanyu Ger, Naperville, IL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1031 days.

(21) Appl. No.: 11/425,796

(22) Filed: Jun. 22, 2006

(51) Int. Cl.
*H04L 12/28* (2006.01)

(52) U.S. Cl. .................. 370/228; 370/230; 370/235; 370/401

(58) Field of Classification Search .................. None
See application file for complete search history.

(56) References Cited

U.S. PATENT DOCUMENTS

| | | | | |
|---|---|---|---|---|
| 5,023,868 A | * | 6/1991 | Davidson et al. | 370/270 |
| 6,195,336 B1 | * | 2/2001 | Stumer | 370/238 |
| 7,126,908 B1 | * | 10/2006 | Lu et al. | 370/228 |
| 7,180,866 B1 | * | 2/2007 | Chartre et al. | 370/242 |
| 7,450,502 B1 | * | 11/2008 | Croak et al. | 370/230 |
| 2006/0101098 A1 | * | 5/2006 | Morgan et al. | 707/204 |
| 2006/0106823 A1 | * | 5/2006 | Clark et al. | 707/100 |

* cited by examiner

*Primary Examiner*—Chi H. Pham
*Assistant Examiner*—Shick Hom (57) ABSTRACT

A system may include a destination device that receives information about a caller via a first outgoing leg and exchanges content with the caller via the first outgoing leg. The system may further include a network device that receives an incoming call from the caller, establishes the first outgoing leg, connects the incoming call to the first outgoing leg so the content can be exchanged, monitors the first outgoing leg, selectively establishes a second outgoing leg in response to the monitoring, and connects the incoming call to the second outgoing leg.

16 Claims, 6 Drawing Sheets

CALL MANAGEMENT

BACKGROUND INFORMATION

Business entities may use call centers to handle calls from customers. For example, a telecommunications provider may use call centers to accept calls regarding service offerings, repair questions, directory assistance, etc.

A customer may contact a call center by dialing a number, such as an 800 number. The customer's call may be placed into a queue and may be answered when a service representative becomes available. In certain situations, the customer may need to respond to prompts, such as voice prompts, and/or may need to enter information, such as account information, before his/her call is placed into the queue. Once the customer's call is placed into the queue, the customer may have to wait for a service representative to become available.

Eventually the customer's call may be answered by a service representative. At times, the customer may become disconnected from the service representative because of routing problems related to the call, defective equipment (e.g., noisy telephone lines), etc. The customer may have to redial the 800 number and may be placed at the bottom of the queue after responding to the voice prompts and/or entering his/her information. The customer may become dissatisfied with delays caused by being placed back into the queue and may decide to switch to another telecommunications provider.

BRIEF DESCRIPTION OF THE DRAWINGS

The accompanying drawings, which are incorporated in and constitute a part of this specification, illustrate one or more embodiments of the invention and, together with the description, explain the exemplary embodiments. In the drawings.

DETAILED DESCRIPTION OF PREFERRED EMBODIMENTS

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may employ a network device, such as a server, that operates between a source device, such as a calling device, and a destination device. The network device may receive signaling information and media via an incoming link from the calling device. The network device may further establish an outgoing link with the destination. The network device may bridge the incoming link with the outgoing link to send the signaling information and/or media to the destination device on behalf of the calling device as part of a communication session therebetween. Implementations may operate with one or more signaling methods and/or one or more media types.

Implementations of the network device may monitor signaling information and/or media on the incoming and/or outgoing link during the communication session. The network device may create a new link, such as a replacement link, and may send signaling information and/or media from the calling device to the destination device, or to another device, via the replacement link by bridging the incoming link to the replacement link within the network device. The network device may maintain contact with the calling device when switching signaling information and/or media from the outgoing link to the replacement link so that the calling device does not have to reestablish contact with the network device. The network device may drop the outgoing link when the replacement link is established.

Exemplary System

Figure 1:
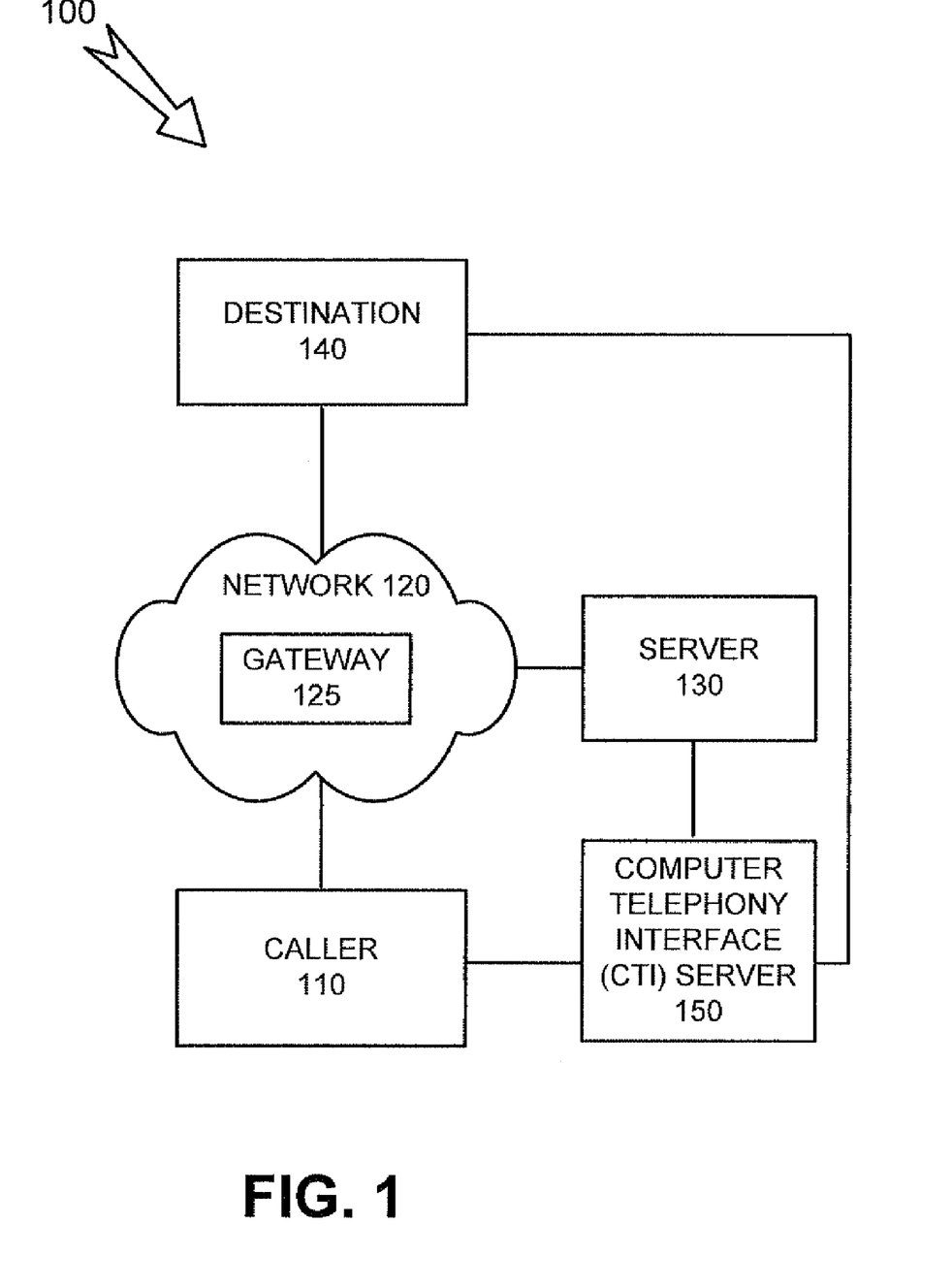
FIG. 1 illustrates an exemplary system that can be configured to operate in accordance with principles of the invention.

FIG. 1 illustrates an exemplary system that can be configured to operate in accordance with the principles of the invention. System 100 may include a caller 110, a network 120, a gateway 125, a server 130, a destination 140, and a computer-telephony-interface (CTI) server 150.

Caller 110 may include a device capable of sending information to a destination. For example, caller 110 may include a plain old telephone system (POTS) device, a web-enabled cellular telephone, an Internet protocol (IP) telephone, a computer, such as a desktop computer, a laptop computer, a client, a server, a personal digital assistant (PDA), or another computation or communication device.

In one implementation, caller 110 may establish a communication session with a destination by sending signaling information to an intermediate device, such as server 130. The intermediate device may forward signaling information to the destination on behalf of caller 110 to set up the communication session. Caller 110 may exchange media, e.g., numerical data, text, images, video, speech, etc., with the destination during the communication session. Caller 110 may send media through server 130 en route to a destination and/or may send media directly to a destination. In one implementation, caller 110 may send signaling information over a signaling channel and media over a media channel. In another implementation, caller 110 may send signaling information and media over the same channel. Implementations of caller 110 may send analog and/or digital signaling information and/or media. Digital signaling information and/or media may include non-packet-based and/or packet based information.

Network 120 may include any network capable of transferring information. Implementations of network 120 may include public switched telephone networks (PSTNs), local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), etc. Network 120 may include network devices, such as routers, switches, firewalls, gateways, and/or servers (not shown). Network 120 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Gateway 125 may include one or more devices that route traffic to and/or from a network. Gateway 125 may be implemented inside network 120 and/or on an edge of network 120. Gateway 125 may serve as an entrance point to network 120 for a device, such as client 110, and/or may serve as an entrance to a second network from a first network.

Server 130 may include a device capable of receiving information from, and transmitting information to, another device and/or network. For example, server 130 may include a workstation, desktop computer, laptop computer, PDA, web enabled cellular telephone, Wi-Fi device, or another type of network device. In one implementation, server 130 may provide a service to other devices in system 100, such as caller 110 and/or destination 140. Implementations of server 130 may include a single device and/or a cluster of devices. Moreover, server 130 may be adapted to handle signaling information, such as call control signaling, and/or media. Server 130 may include one or more media gateways, soft-switches, etc., when server 130 is adapted to handle media. Implementations of server 130 may further include one or more media and/or signaling processors to process media and/or signaling data, respectively.

In an implementation, server 130 may be implemented as a session initiation protocol (SIP) compliant device to enable caller 110 and destination 140 to establish communication sessions using SIP-based messages. For example, server 130 may be implemented as a SIP back-to-back user agent (B2BUA) that operates on behalf of network 120. A B2BUA may include user agent functionality and may operate between a sending device (e.g., caller 110) and a destination device (e.g., destination 140). For example, a B2BUA implementation of server 130 may receive a signaling message from caller 110 that requests a communication session with destination 140. Server 130 may forward the signaling message to destination 140 on behalf of caller 110. Server 130 may perform call management functions, such as call setup, call teardown, call monitoring, call reconnection, etc. Implementations of server 130 may include functionality of other types of devices, such as routers, gateways, firewalls, switches, etc., consistent with principles of the invention. For example, server 130 may include media quality monitoring functions, media improvement functions, etc.

Destination 140 may include a device capable of sending information to a network or receiving information from a network. Destination 140 may include a POTS device, a computer, such as a desktop computer, a laptop computer, a client, a server, a personal digital assistant (PDA), a web-enabled cellular telephone, or another computation or communication device. In one implementation, access to destination 140 may be managed via server 130.

CTI server 150 may include a device to send and/or receive information related to a call. In an implementation, CTI server 150 may include a device that sends out-of-band information to a destination, where the out-of-band information is related to in-band information (e.g., voice data) for a call. For example, CTI server 150 may provide information from a service provider's database to a destination along with in-band call data. The database information may be displayed at the destination via a pop-up window and may include information about a calling party, such as caller ID information, an address of the caller, information about transactions recently requested and/or performed by the caller, etc.

Exemplary Server Architecture

Figure 2:
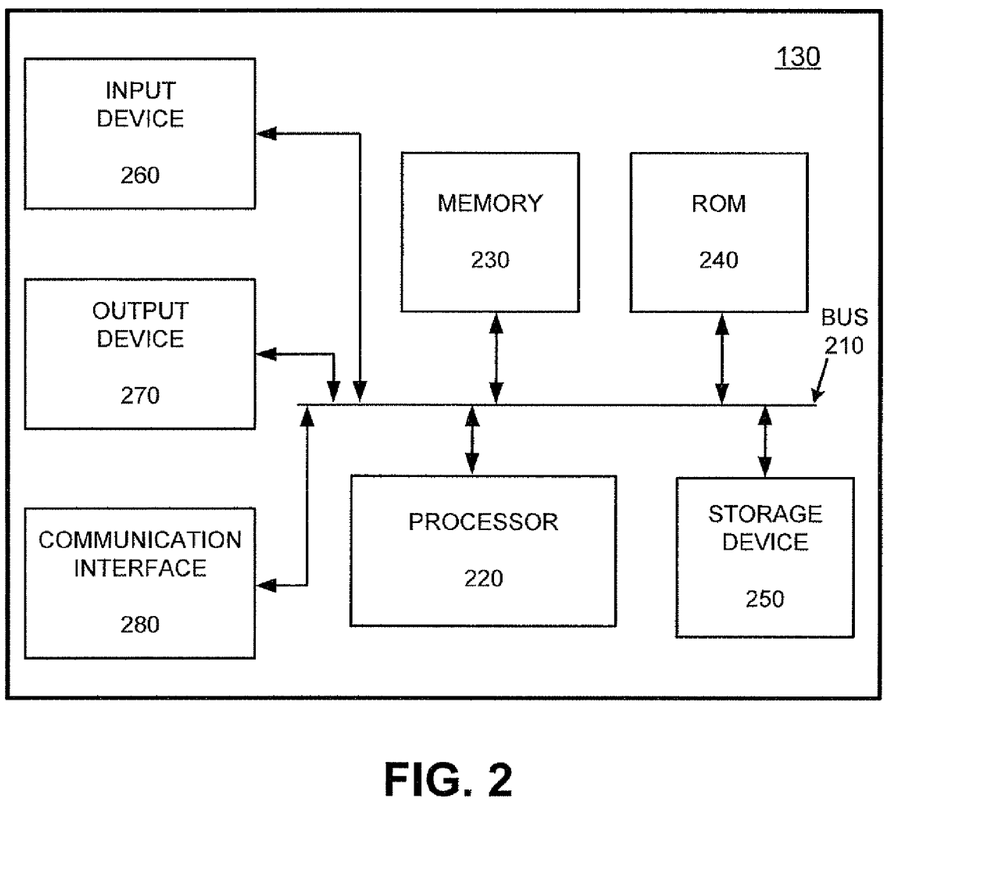
FIG. 2 illustrates an exemplary architecture for implementing the server of FIG. 1 consistent with principles of the invention.

FIG. 2 illustrates an exemplary architecture for implementing server 130 consistent with the principles of the invention. It will be appreciated that caller 110, destination 140, and/or other devices, such as gateways (not shown) that can be used in system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as caller 110 and/or destination 140. For example, communication interface 280 may include a modem, an Ethernet interface, and/or a port. Alternatively, communication interface 280 may include other mechanisms for communicating via a network, such as network 120.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Functional Diagram

Figure 3:
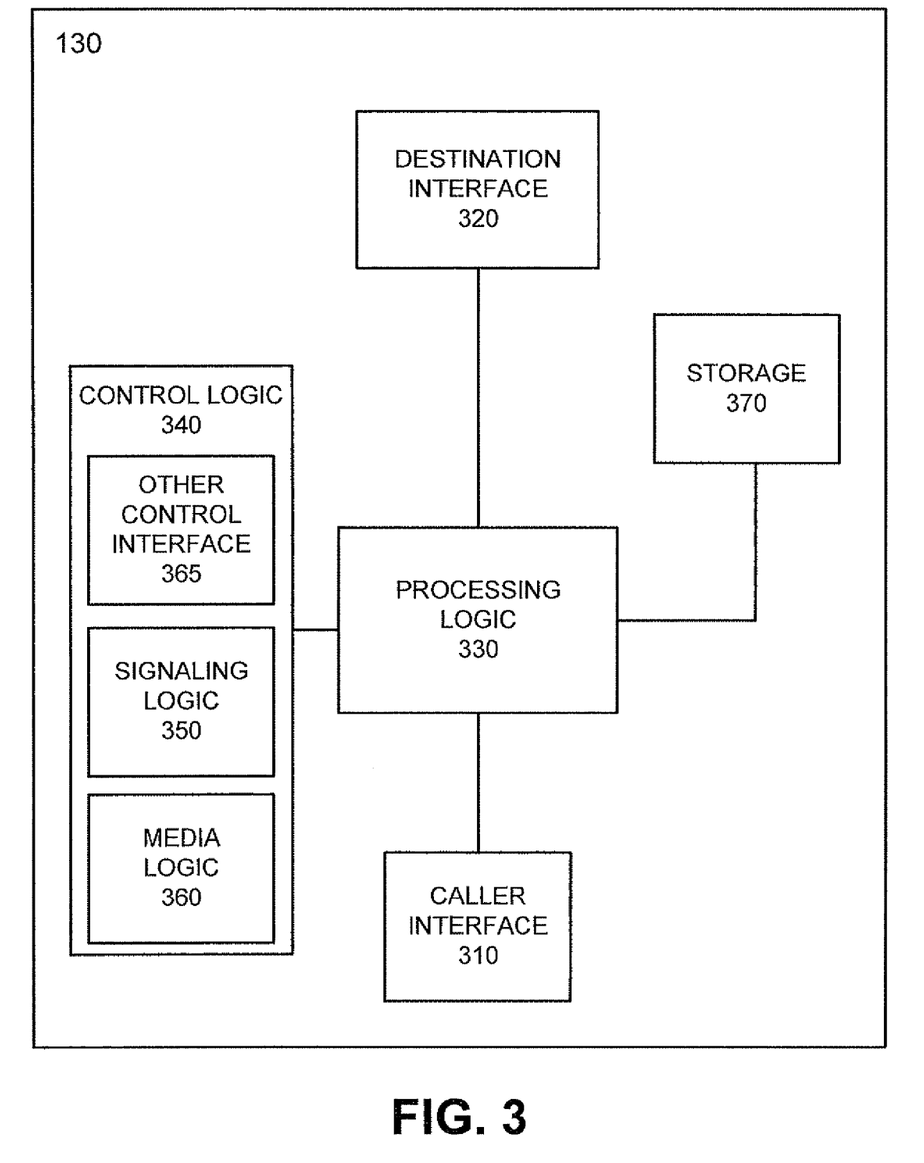
FIG. 3 illustrates an exemplary functional diagram of a server consistent with principles of the invention.

FIG. 3 illustrates an exemplary functional diagram of server 130 consistent with the principles of the invention. Server 130 may include logic that allows server 130 to operate as an intermediate device between caller 110 and destination 140. Implementations of server 130 may operate on behalf of network 120 and may interact with portions of a call, such as an inbound leg from caller 110 and/or an outbound leg to destination 140. Server 130 may perform signaling operations to initiate a call between caller 110 and destination 140 and/or media operations to allow caller 110 to send data to and/or to receive data from destination 140. Server 130 may further perform monitoring operations on signaling and/or media portions of a call during call setup, an exchange of media between caller 110 and destination 140, during call teardown, during call reconnection, during call routing/rerouting, etc.

An implementation of server 130 may include a caller interface 310, a destination interface 320, processing logic 330, control logic 340, and storage 370. Caller interface 310 may include hardware and/or software based logic to communicate with caller 110. Caller interface 310 may receive signaling information and/or media from caller 110 and/or may send signaling information and/or media to caller 110. Destination interface 320 may include hardware and/or software based logic to communicate with destination 140. Destination interface 320 may send signaling information and media to destination 140 and/or may receive signaling information and media from destination 140.

Processing logic 330 may include hardware and/or software to process instructions related to establishing communication sessions between one or more calling devices and one or more destinations. Processing logic 330 may further perform processing operations related to calls, such as billing, directory assistance, etc. Processing logic 330 may be implemented in a standalone or distributed configuration, such as by being distributed across one or more devices.

Control logic 340 may include hardware and/or software to control call setup, call monitoring, call teardown, call reconnection, etc. Control logic 340 may allow server 130 to insert itself into a call between a calling party and a destination. Control logic 340 may set up an inbound leg to server 130 from caller 110 and an outbound leg from server 130 to destination 140. Control logic 340 may further monitor the call legs and may reestablish one or more call legs when, for example, excessive noise is detected on one or more call legs. In one implementation, control logic 340 may reestablish an outgoing call leg without disconnecting an incoming call leg. Control logic 340 may include signaling logic 350, media logic 360, and/or other control interface 365.

Signaling logic 350 may include hardware and/or software to receive signaling messages from other devices, such as caller 110 and/or destination 140, and/or to send signaling messages to a device. Signaling messages sent from or received by signaling logic 350 may be related to call setup, call teardown, call reconnection, call forking, etc. Signaling logic 350 may send or receive signaling messages via links used to carry media and/or via dedicated signaling links. In one implementation, signaling logic 350 may operate with SIP signaling messages.

Media logic 360 may include hardware and/or software to receive media from a device and/or to forward the media to a destination. Media logic 360 may handle a single media type, such as audio, video, data, etc. and/or may handle hybrid media types that include two or more types of media. Media logic 360 may perform conversion operations on media. For example, media logic 360 may receive analog speech via a PSTN and may convert the analog speech into packet-based speech for use over a voice over Internet protocol (VoIP) based link to a destination device. Implementations of media logic 360 may include monitoring capabilities to monitor media coming into server 130 from a source device (e.g., caller 110) and/or to monitor media sent from server 130 to a destination device (e.g., destination 140). Media logic 360 may be implemented in one or more components and may include media gateway, soft-switch, and/or other types of functionality.

Other control interface 365 may include hardware and/or software based logic to allow server 130 to communicate with other devices on network 120. For example, other control interface 365 may allow server 130 to communicate with control systems, such as other servers, operating on network 120. Operation of server 130 may be coordinated with these control systems to perform signaling and/or media operations. For example, server 130 may operate with other servers that maintain databases and include additional intelligence that can be used by server 130 when performing operations related to a call.

Storage 370 may include hardware and/or software based logic to store instructions, signaling information, media, measurement values, and/or other types of information related to call setup, call monitoring, call teardown, call reconnection, etc. Storage 370 may be implemented in memory 230, ROM 240, storage device 250, etc.

Exemplary Call Connection/Reconnection

Figure 4A:
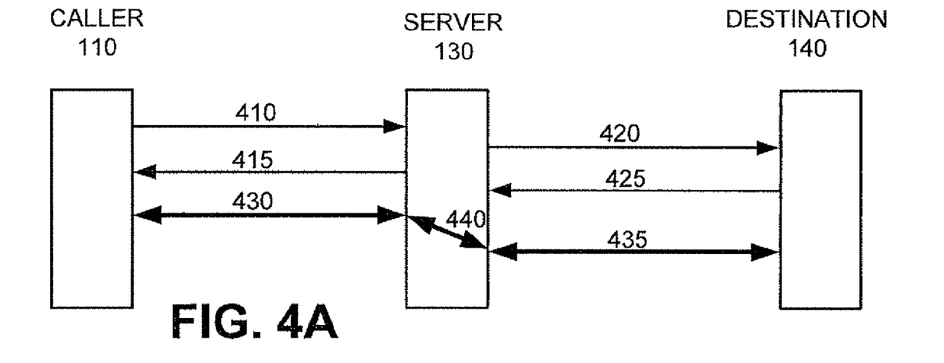
FIGS. 4A-4C illustrate exemplary call connection and reconnection techniques consistent with principles of the invention.
Figure 4B:
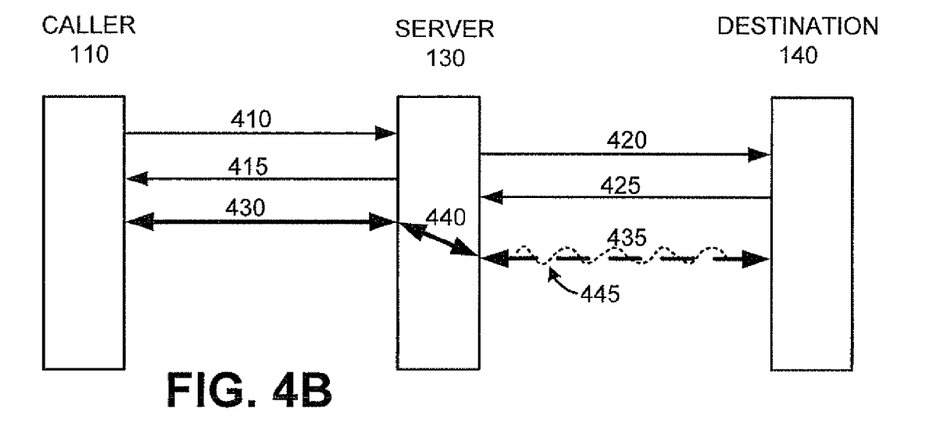
Figure 4C:
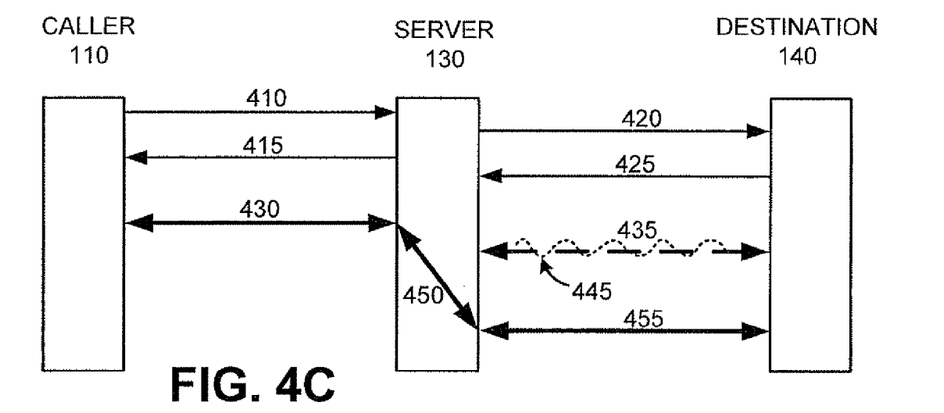

FIGS. 4A-4C illustrate exemplary call connection and reconnection techniques consistent with the principles of the invention. The implementations of FIGS. 4A-4C may include caller 110, server 130 and destination 140. Other implementations (not shown) may include more devices, such as gateways, or fewer devices consistent with principles of the invention. For example, an implementation of server 130 may include one or more gateways for handling multiple call legs.

In the implementation of FIG. 4A, caller 110 may send request 410 to server 130. Request 410 may include information that asks server 130 to connect caller 110 to destination 140. Server 130 may acknowledge receipt of request 410 by sending acknowledgement 415. Acknowledgement 415 may indicate that server 130 has received request 410 and that server 130 is willing to contact destination 140 on behalf of caller 110.

Server 130 may send request 420 to destination 140. Request 420 may include a forwarded version of request 410 and/or may include a new request generated by server 130 on behalf of caller 110. Destination 140 may answer request 420 with acknowledgement 425. Acknowledgement 425 may inform server 130 that request 420 was received and that destination 140 is willing to accept a call from caller 110. Media may be exchanged between caller 110 and destination 140 when signaling messages 410, 415, 420 and 425 have been exchanged between caller 110, server 130 and destination 140. The media portion of a call may include first leg 430, second leg 435 and bridged portion 440.

First leg 430 may include media sent from caller 110 to server 130 as part of a communication session. Server 130 may bridge media received via first leg 430 to second leg 435 using bridging portion 440. Bridging portion 440 may be implemented internal to server 130 such as by coupling a link connected to caller interface 310 to a link connected to destination interface 320. Second leg 435 may extend directly from server 130 to destination 140 or may go from server 130 through other devices and/or networks (not shown) before reaching destination 140.

FIG. 4B illustrates the call of FIG. 4A where server 130 has detected interference 445 on second leg 435. In one implementation, server 130 may detect interference 445 via control logic 340 (e.g., when media logic 360 detects excessive noise on second leg 435). Server 130 may perform operations in response to interference 445 to maintain a determined level of call quality as described hereinafter.

FIG. 4C illustrates the call of FIG. 4B where server 130 has dropped second leg 435 and connected caller 110 to destination 140 via replacement leg 455. Server 130 may use bridged portion 450 to connect first leg 430 to replacement leg 455. Since server 130 operates in the calling path between caller 110 and destination 140, server 130 can perform operations that establish new call legs, terminate call legs, and/or monitor call legs. Implementations of server 130 can perform these operations without disconnecting caller 110. Server 130 can maintain contact with caller 110 because server 130 can treat first leg 430, second leg 435, replacement leg 455, and/or other legs as independent legs that can be connected, disconnected, routed, and/or monitored individually and/or collectively.

Server 130 may employ a number of techniques for establishing replacement leg 455. For example, server 130 may include logic programmed to allow server 130 to automatically establish replacement leg 455 and/or to allow destination 140 to issue an instruction to cause server 130 to establish replacement leg 455. For example, server 130 may receive an instruction via a signal associated with a keypad entry, an entry from a touch sensitive screen, etc., to establish replacement leg 455 using out-of-band information.

The implementations of FIGS. 4A-4C illustrate second leg 435 being replaced with replacement leg 455. Other implementations may create replacement leg 455 while second leg 435 is maintained (e.g., by performing a forking operation that allows first leg 430 to be connected with second leg 435 and replacement leg 455 at the same time). Still other implementations may be configured to reconnect second leg 435 and/or other legs, such as first leg 430. For example, first leg 430 and second leg 435 may be related to a cellular phone call. Server 130 may be configured to allow caller 110 and/or destination 140 to enter a signal (e.g., a keypad entry) to request reconnection of first leg 430, second leg 435, and/or both legs of the call. Server 130 may receive and/or generate substantially any number of first legs 410, second legs 435, bridged portions 440 or 450, and/or replacement legs 455.

Exemplary Data Structure

Figure 5:
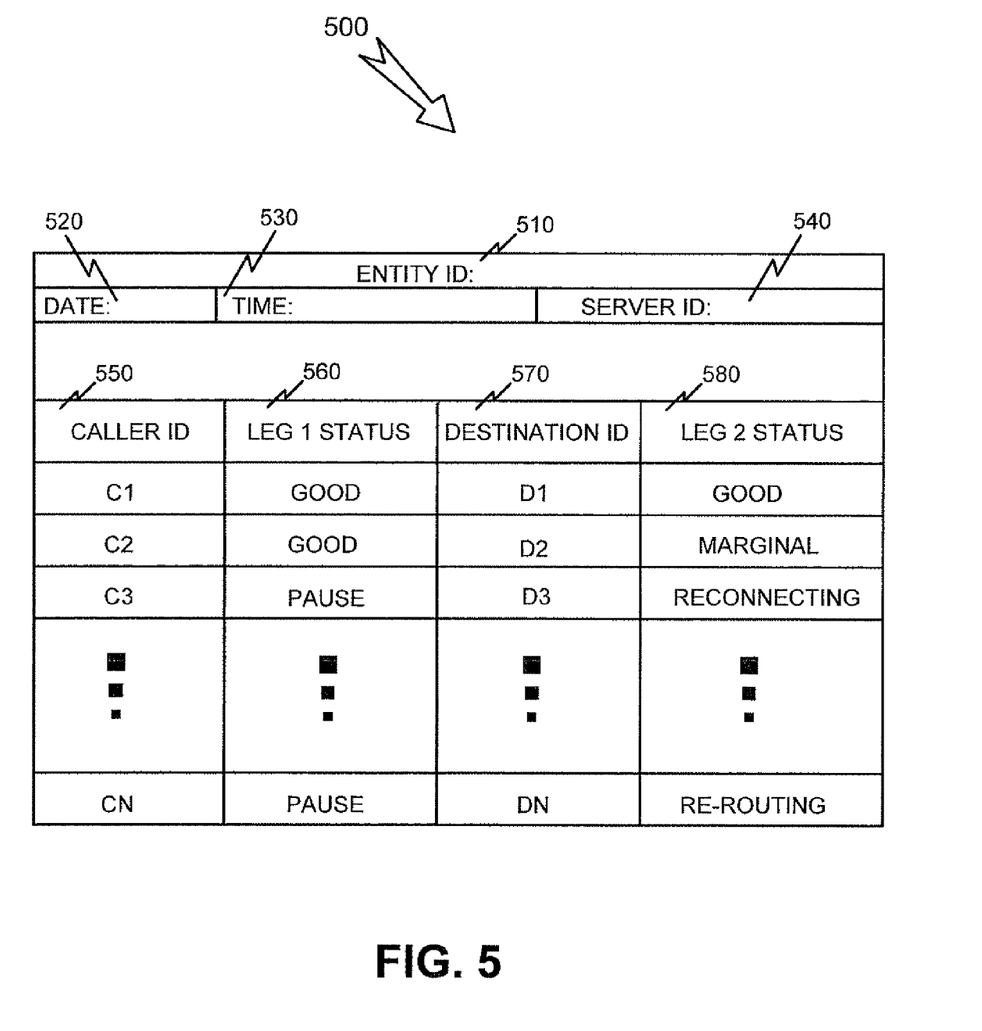
FIG. 5 illustrates an exemplary data structure consistent with principles of the invention.

FIG. 5 illustrates an exemplary data structure 500 consistent with the principles of the invention. Implementations of server 130 may operate with one or more data structures 500 when performing call setup, teardown, monitoring operations, and/or other types of call related operations. An implementation of server 130 may store a data structure 500 that can include entity ID 510, date 520, time 530, server ID 540, caller ID 550, leg 1 status 560, destination ID 570, and leg 2 status 580. Data structure 500 may be stored in storage device 250 and/or elsewhere in system 100.

Entity ID 510 may include information that identifies an entity that is related to information in data structure 500. For example, server 130 may be operated by a telecommunications provider. The telecommunications provider may provide call setup, teardown, and call monitoring capabilities to corporate customers, such as corporate customers that maintain call centers. Entity ID 510 may include information that identifies a corporation that is related to, for example, destinations identified via entries in destination ID 570.

Date 520 may identify a date on which data structure 500 was created and/or modified. Time 530 may identify a time at which data structure 500 was created and/or modified. Server ID 540 may identify a server on which data structure 500 is maintained and/or may identify a server that created data structure 500.

Caller ID 550 may include information that identifies one or more callers 110. Caller ID 550 may identify a person related to caller 110 (e.g., such as an operator of caller 110), an address of caller 110, a device type of caller 110, etc. Leg 1 status 560 may include information that can be used to make a determination with respect to a call leg related to caller 110. For example, leg 1 status 560 may include information related to call quality on a first leg of a call, such as a leg between caller 110 and server 130. Leg 1 status 560 may further include information about a state of a call leg, such as whether the leg is carrying media, is paused, is dropped, is forked, etc. Leg 1 status 560 may include numerical values, words, and/or other types of information that can be used to make determinations with respect to a call leg related to caller 110.

Destination ID 570 may include information that identifies one or more destinations 140. Destination ID 570 may further identify one or more persons related to the one or more destinations 140, may identify geographic locations related to the one or more destinations 140, may identify one or more types of destination devices, etc. Leg 2 status 580 may include information that can be used to make a determination with respect to a second leg of a call, such as a leg from server 130 to destination 140. For example, leg 2 status 580 may include numerical values, words, and/or other types of information that can be used to make determinations with respect to a call leg related to destination 140.

The implementation of data structure 500 discussed in connection with FIG. 5 is exemplary and other implementations of data structure 500 are possible. Other implementations of data structure 500 may include more fields or fewer fields. For example, an alternative implementation of data structure 500 may include fields containing information identifying alternative destinations to be used in the event that a call leg with an existing destination becomes inoperative, fields containing billing information, fields containing passwords and/or other types of authorization information, etc.

Exemplary Process

Figure 6:
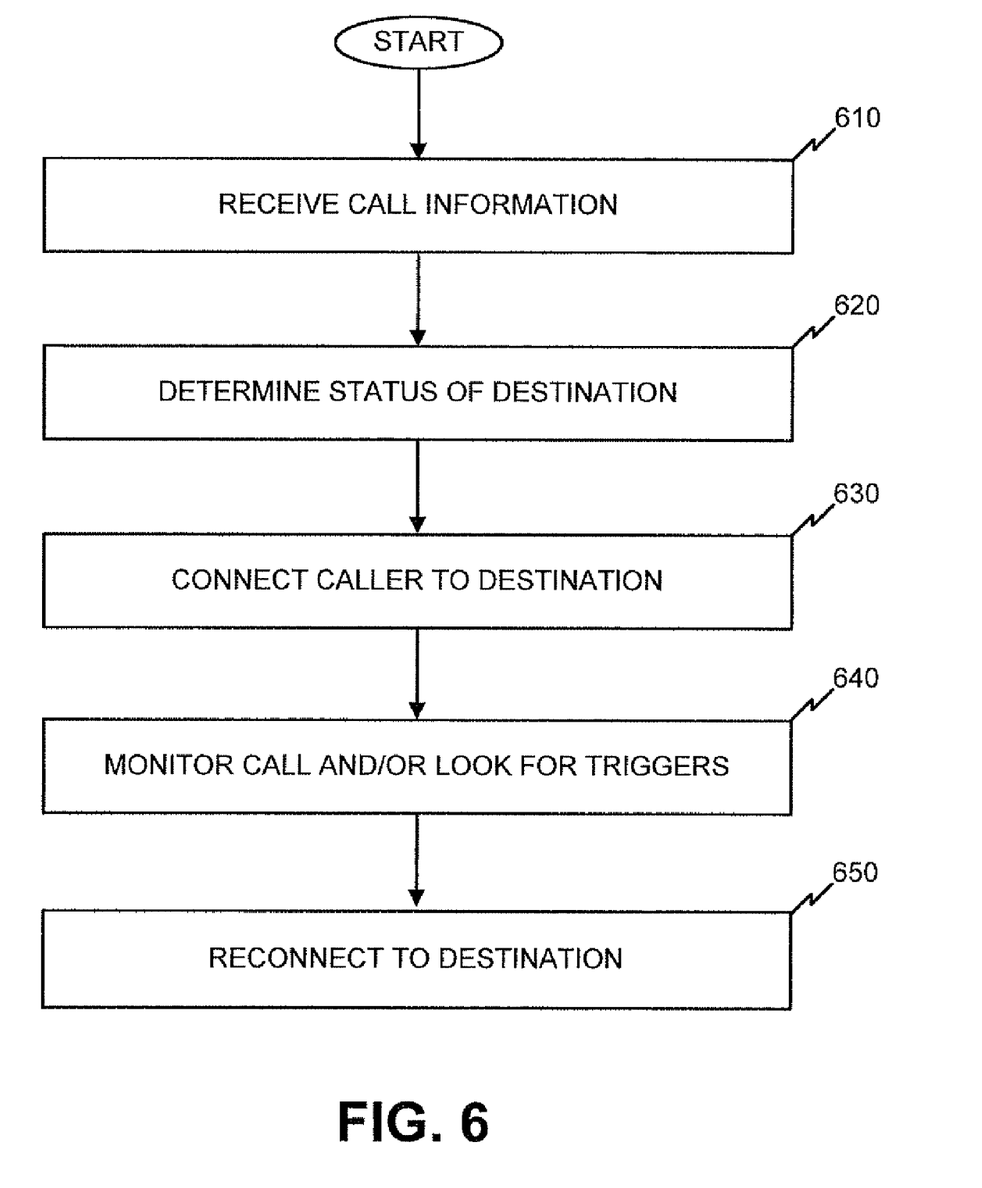
FIG. 6 illustrates exemplary processing consistent with principles of the invention.

FIG. 6 illustrates an exemplary process consistent with the principles of the invention. Implementations described herein may allow caller 110 and/or destination 140 to interact with portions of network 120 via server 130. Network 120 may treat call legs independently using server 130 since calling devices and called devices can interact with the network via server 130. Since server 130 is communicating with calling devices and with called devices, the server 130 can make decisions on behalf of these devices that can improve call quality and/or call reliability.

Server 130 may receive call information (block 610). For example, a customer may dial a phone number using a PSTN device. The call may pass through a PSTN to VoIP gateway where call signaling information and/or media is converted into an IP compatible format. The PSTN to VoIP gateway may be implemented in server 130 and/or elsewhere in system 100. In one implementation, server 130 may receive signaling information from a calling device, such as caller 110. The signaling information may act as a request for a communication session between the caller and a destination device, such as destination 140. For example, server 130 may receive request 410 (FIG. 4) from caller 110 via caller interface 310. Request 410 may include information that identifies the calling device and destination device, such as a telephone number, IP address, SIP address, etc. Server 130 may respond to request 410 with acknowledgement 415 to let caller 110 know request 410 was received and understood. Server 130 may store information about caller 110 in a data structure, such as data structure 500 (FIG. 5). For example, server 130 may assign an identifier to caller 110 and may store the identifier in caller ID 550.

Server 130 may determine a status of a destination (block 620). For example, server 130 may determine if the destination device (destination 140) is available and/or authorized to receive a call from caller 110 before connecting caller 110 to destination 140. In one implementation, server 130 may send request 420 to destination 140 via destination interface 320. Request 420 may include information requesting that a communication session be set up on behalf of caller 110. Request 420 may further include information that identifies server 130 and/or information related to caller 110, such as a location of caller 110, an identity of an operator of caller 110, etc. Destination 140 may reply to request 420 with acknowledgement 425. Acknowledgement 425 may indicate that destination 140 is available and willing to accept a call from caller 110.

Acknowledgement 425 may further include information about media formats that destination 140 can accommodate, such as data rates, communication protocols, encryption protocols, etc. Server 130 may store information about destination 140 in data structure 500 (e.g., by storing an identifier for destination 140 in destination ID 570).

Server 130 may connect caller 110 to destination 140 (block 630). For example, server 130 may request media from caller 110 when destination 140 indicates that it is available and willing to accept a call from caller 110. In one implementation, server 130 may request media from caller 110 via acknowledgement 415. In other implementations, server 130 may request media via a separate message, such as a media request message (not shown in FIGS. 4A-4C). Media received at server 130 from caller 110 may be sent to destination 140 via server 130.

Implementations of server 130 may receive signaling information and media via the same link or channel and/or may receive signaling information on one link/channel and media on another link/channel. In one implementation, server 130 may receive media from caller 110 via first leg 430 and may send the media to destination 140 via second leg 435. Server 130 may bridge first leg 430 to second leg 435 via bridging portion 440. Server 130 may maintain information about first leg 430 and second leg 435 in data structure 500 (e.g., via leg 1 status 560 and/or leg 2 status 580). Caller 110 and destination 140 may exchange media and/or signaling information through server 130 during a call.

Server 130 may monitor the call between caller 110 and destination 140 (block 640). Implementations of server 130 may remain in the signaling and/or media path during a call. Server 130 may monitor incoming and/or outgoing signaling messages and/or media throughout the duration of a call. For example, server 130 may sample first leg 430, second leg 435 and/or bridging portion 440 during a call to determine types of media being exchanged, link bandwidths, link qualities (e.g., noise levels on links), etc. Server 130 may update data structure 500 based on the monitoring, such as by writing monitoring and/or measurement results into data structure 500.

Server 130 may monitor call portions via a number of techniques. For example, server 130 may monitor call portions and/or may make decisions based on the monitoring according to one or more configurable rules. The rules may reside locally on server 130, e.g., in memory 230, and/or may be retrieved from a remote device in system 100. The rules may configure server 130 to act automatically based on the monitoring, e.g., without receiving instructions from a calling party and/or a destination party, and/or may configure server 130 to act based on instructions received from the calling party and/or destination party. For example, server 130 may listen for an in-band signal, such as a dual tone multi-frequency (DTMF) signal, and/or an out-of-band signal, such as a signal received from a button on a touch sensitive display device.

Server 130 may further monitor one or more signaling paths for caller 110 or destination 140 during the call. Server 130 may monitor signaling and/or media paths to maintain call quality and/or to process call related instructions, such as hang up instructions, re-direction instructions, etc. Assume server 130 detects a problem in a leg of the call, such as second leg 435. For example, server 130 may determine that a noise level on second leg 435 has exceeded a predetermined noise threshold value, where the noise threshold value identifies when call related noise is outside a desired range.

Server 130 may drop second leg 435 and may re-connect caller 110 to destination 140 via replacement leg 455. Server 130 may maintain contact with caller 110 while dropping second leg 435 and establishing replacement leg 455. In one implementation, server 130 may connect first leg 430 to replacement leg 455 via bridging portion 450. Server 130 may monitor first leg 430, bridging portion 450 and replacement leg 455 during the call and may perform call operations based on the monitoring, such as terminating a leg, reconnecting a leg, tabulating billing information for the call, etc. Server 130 may create an entry in data structure 500 for replacement leg 455 (e.g., an entry in destination ID 570 and leg 2 status 580).

Implementations of server 130 may be used in a number of types and/or configurations to implement call management functions. Below, selected exemplary implementations are described. Assume, for sake of example, that server 130 operates on behalf of an entity that maintains call centers to provide customer support. Further assume, for sake of example, that one call center is located in Ireland and another call center is located in India.

A customer, operating caller 110, may place a call to an 800 number associated with the entity to obtain help with a problem. Caller 110 may place the call over a PSTN. The PSTN may make call information available to a VoIP gateway, where server 130 may be implemented as a SIP B2BUA. Server 130 may convert PSTN information into a SIP compatible message (e.g., a SIP signaling message). The SIP signaling message may be a request for a communication session (e.g., request 410) with a destination device (e.g., destination 140).

Server 130 may process request 410 and/or may send acknowledgement 415 to caller 110. Server 130 may forward request 410 to a destination 140 that is located in Ireland. Destination 140 may be a desktop IP phone used by a customer service representative working in Ireland on behalf of the entity. Destination 140 may send acknowledgement 425 to server 130 and server 130 may establish first leg 430 with caller 110 and second leg 435 with destination 140 to allow media to be exchanged between caller 110 and destination 140. Server 130 may treat first leg 430 and second leg 435 as separate call legs that can be handled independently of each other. For example, server 130 may be able to drop or transfer first leg 430 without dropping or transferring second leg 435, or vice versa. Server 130 may connect first leg 430 to second leg 435 via first bridging portion 440 so that the caller and the customer service representative can communicate about the customer's problem.

Server 130 may monitor signaling information and/or media related to first leg 430, second leg 435 and/or bridging portion 440 during the call. Assume that server 130 is monitoring interference levels on a media leg, such as second leg 435, during the call. Further assume that server 130 maintains a data structure that includes an interference range. When server 130 detects that interference on second leg 435 is outside the interference range, server 130 may process instructions to replace second leg 435 with another leg. In one implementation, server 130 may replace second leg 435 (desktop telephone) with replacement leg 455 that is connected to a cell phone used by the customer service representative located in Ireland. In a second implementation, server 130 may replace second leg 435 with replacement leg 455 that goes to a desktop IP phone of a customer service representative located in India.

Server 130 may play a message for caller 110 while dropping second leg 435 and establishing replacement leg 455. For example, server 130 may play a message that tells the caller to remain on the line while server 130 drops second leg 435 and establishes replacement leg 455. Server 130 may bridge first leg 430 to replacement leg 455 via bridging portion 450. Server 130 may monitor first leg 430, replacement leg 455 and/or bridging portion 450 during the call. The caller and customer service representative located in India may resume the call without requiring that the caller re-dial a number or transmit other data to server 130 and/or destination 140 via caller 110.

Implementations of server 130 may be configured to operate in accordance with policies that an entity may use with individuals operating, for example, implementations of destination 140. For example, an entity may tell its customer service representatives that they should not hang up until a calling party (e.g., a customer) first hangs up his/her handset. Such a policy may allow server 130 to determine that hang up signals detected via a signaling paths related to destination 140 (e.g., received via second leg 435 or replacement leg 455) must occur after hang up signals related to caller 110 (e.g., received first leg 430) to be interpreted as a valid hang up signals.

Server 130 may treat hang up signals received from destination 140 prior to hang up signals received from caller 110 as hang up signals caused by interference on a second leg 435 (e.g., interference on a signaling path between server 130 and destination 140). Server 130 may perform operations in response to the interference detected on second leg 435. For example, server 130 may keep first leg 430 alive and may establish replacement leg 455 in response to the premature hang up signal received from destination 140.

Implementations of server 130 may establish replacement legs in response to signals received on behalf of an operator of a device, such as an operator of destination 140. For example, a customer service representative may depress any keypad digit within a time period (e.g., three seconds) after prematurely losing contact with a calling party. Server 130 may respond to the keypad signal and may establish replacement leg 455 to destination 140. Server 130 may keep first leg 430 alive for more than three seconds when contact with destination 140 is lost in order to give destination 140 time to enter a keypad digit to reestablish contact with the calling party. Server 130 may release legs related to caller 110 when three seconds has elapsed and no reconnection signal is received from destination 140, since this combination of events may represent a valid hang up sequence for caller 110 and destination 140.

Implementations of server 130 may be configured to provide call back functions to a calling party and/or a destination party when a failure, such as a dropped call, occurs during call setup. For example, server 130, operating in a B2BUA implementation, may receive a call from caller 110. Server 130 may include an interactive voice response (IVR) application to route the incoming call according to inputs received from caller 110. For example, server 130 may establish an outgoing leg to a first operator based on caller 110 inputs to the IVR application to establish a communication session between caller 110 and the first operator. During the communication session, the first operator may determine that caller 110 should be routed to a second operator. The first operator may provide instructions to the IVR application and server 130 may establish a second outgoing leg to the second operator.

Assume that caller 110 is inadvertently dropped when server 130 is establishing the second outgoing call leg to the second operator. Server 130 may be configured to redial a number associated with caller 110 to reestablish communication with caller 110. Server 130 may play a message to caller 110 via the IVR application to inform a user of caller 110 that his/her call leg was inadvertently dropped while connecting caller 110 to the second operator. Caller 110 may remain on the line and may be connected to the second operator and/or the first operator or may hang up to terminate the session. Server 130 may be configured to disconnect the first and/or second operators when caller 110 hangs up.

Implementations of server 130 may operate with wireline and/or wireless devices. For example, caller 110 may place a call via a cell phone to destination 140. Server 130 may monitor signaling information and media exchanged between caller 110 and destination 140. Server 130 may detect that caller 110 lost contact with a base station servicing caller 110. Server 130 may be configured to receive a sequence from caller 110, (e.g., *7) and to reestablish contact with caller 110 via a replacement leg upon receipt of the *7 sequence. Server 130 may be further configured to play a message to destination 140 while waiting for the *7 sequence or while establishing the replacement leg. The message may tell a party at destination 140 to remain on the line while contact with caller 110 is reestablished.

CONCLUSION

Implementations consistent with the principles of the invention may allow a device to operate between a calling party and a destination. In an implementation, the calling party may interact with a server and the server may communicate with a destination on behalf of the calling party. The server may be adapted to monitor signaling and media aspects of a call between the calling party and the destination. The server may add and/or drop call legs in response to the monitoring without requiring that the calling party or destination to re-dial a number associated with the other party.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations consistent with the principles of the invention can be implemented using devices and configurations other than those illustrated in the figures and described in the specification without departing from the spirit of the invention. Devices and/or components may be added and/or removed from the implementations of FIGS. 1-4 depending on specific deployments and/or applications. Further, disclosed implementations may not be limited to any specific combination of hardware, software and/or firmware. In addition, while a series of acts has been described with respect to FIG. 6, the order of acts in FIG. 6 may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device, comprising:
an interface to:
receive, via an incoming leg, communication information intended for a destination,
establish, in response to receiving the communication information, an outgoing leg to the destination, including bridging the incoming leg to the outgoing leg,
selectively establish a replacement leg to the destination in response to an instruction, including:
bridging the incoming leg to the replacement leg, and
dropping the outgoing leg when the replacement leg is established, and
maintain the incoming leg when establishing the outgoing leg or the replacement leg; and
a processor to:
monitor the outgoing leg to obtain information about the outgoing leg,
generate the instruction in response to the information, and
send the instruction used by the interface in establishing the replacement leg,
where the device is a session initiation protocol compatible device.

2. The device of claim 1, where the incoming leg and the outgoing leg, respectively, comprise signaling information and media.

3. The device of claim 1, where the instruction is related to signaling information or a media state related to the outgoing leg.

4. The device of claim 1, where the monitoring comprises monitoring a signaling portion or a media portion of the outgoing leg.

5. The device of claim 1, where the destination is associated with a call center.

6. The device of claim 1, where the device operates as a session initiation protocol back-to-back user agent.

7. The device of claim 1, where the device comprises a server, a gateway, a router or a switch.

8. The device of claim 1, where the replacement leg is established via signaling information exchanged with the destination.

9. A system, comprising:
a destination device to:
receive information about a caller via a first outgoing leg, and
exchange, based on the received information, content with the caller via the first outgoing leg; and
a network device comprising a back-to-back user agent, where the network device is to:
receive an incoming call from the caller,
establish the first outgoing leg between the network device and the destination device,
connect the incoming call to the first outgoing leg so the content can be exchanged,
monitor the first outgoing leg,
selectively establish a second outgoing leg, between the network device and the destination device, in response to the monitoring, where the network device drops the first outgoing leg in response to establishing the second outgoing leg, and
connect the incoming call to the second outgoing leg.

10. The system of claim 9, where the network device receives the incoming call from a queue.

11. A method, comprising:
receiving, at a server device, an incoming call portion;
contacting, via the server device, a destination in response to information related to the incoming call portion;
establishing, via the server device, an outgoing call portion from the server device to the destination;
connecting, via the server device, the incoming call portion to the outgoing call portion to allow communication between a source device and the destination;
monitoring, via the server device, the incoming call portion or the outgoing call portion to obtain monitoring information, where the monitoring comprises determining when call termination information related to the destination occurs with respect to call termination information related to the source device; and
selectively establishing, via the server device, a replacement call portion, from the server device to the destination, in response to the monitoring information, where the establishing of the replacement call portion includes:
connecting the incoming call portion to the destination via the replacement call portion, and
dropping the outgoing call portion in response to connecting the incoming call portion to the destination via the replacement call portion.

12. The method of claim 11, where the monitoring comprises:
sampling signaling information or media related to the incoming call portion; and
sampling signaling information or media related to the outgoing call portion.

13. The method of claim 11, where the monitoring comprises:
identifying interference related to the incoming call portion or the outgoing call portion or identifying an instruction related to the incoming call portion or the outgoing call portion.

14. The method of claim 11, where the method further comprises:
receiving information about a length of a time window; and
where the monitoring further comprises:
maintaining contact with the source device for a time interval equal to at least the length of the time window when a termination signal is received from the destination.

15. The method of claim 11, where the method further comprises:
sending a message to the source device when the replacement call portion is established.

16. A network device, comprising:
an interface logic processor to:
receive caller signaling information from a caller,
send the caller signaling information to a destination on behalf of the caller,
receive destination signaling information in response to the caller signaling information,
receive inbound media from the caller when the destination signaling information indicates that the destination will communicate with the caller,
send outbound media to the destination on behalf of the caller, and send the outbound media to the destination via a replacement link when measurement information indicates that the replacement link should be used;
a bridge logic processor to:
bridge an inbound link carrying the inbound media to an outbound link carrying the outbound media to establish a communication session between the caller and the destination, and
bridge the inbound link carrying the inbound media to the replacement link when the replacement link should be used, including dropping the outbound link; and a monitor logic processor to:
monitor the caller signaling information or the destination signaling information,
monitor the inbound media or the outbound media, and
produce the measurement information in response to the monitoring the caller or the destination signaling information or in response to the monitoring the inbound or the outbound media,
where the network device is a session initiation protocol compatible device.

* * * * *